April 23, 1968  B. F. WILEY  3,379,059
FLOW METER WITH GRAVITY AND LIQUID SENSING SWITCHES
Filed May 4, 1966  2 Sheets-Sheet 1

INVENTOR
B. F. WILEY

BY Young & Quigg

ATTORNEYS

United States Patent Office 3,379,059
Patented Apr. 23, 1968

3,379,059
FLOW METER WITH GRAVITY AND
LIQUID SENSING SWITCHES
Bruce F. Wiley, Bartlesville, Okla., assignor to Phillips
Petroleum Company, a corporation of Delaware
Filed May 4, 1966, Ser. No. 547,599
2 Claims. (Cl. 73—155)

ABSTRACT OF THE DISCLOSURE

A flow meter comprising an elongated housing which supports a packer that extends outwardly to engage the walls of a well. First and second flow conduits extend through the housing to communicate with opposite sides of the packer. An impeller which can be rotated at variable speeds is positioned in one conduit. Thermistors are positioned in both conduits and connected to a voltage source so as to provide a measurement of the difference in fluid flows through the two conduits. An electrical conductivity switch is carried by the housing to disconnect the voltage source when the housing is removed from liquid. A gravity switch can be employed to disconnect the voltage source when the housing is positioned on its side.

---

This invention relates to the measurement of liquid flows.

It is often necessary to measure flow rates in inaccessible locations. One need for such a measurement occurs, for example, in measuring the rate at which liquid flows through boreholes. In United States Patent No. 2,822,688, there is disclosed a flow meter which is particularly adapted for use in measuring flows in well bores. Two parallel flow paths are established. Liquid is pumped through one of the flow paths by means of an impeller, and this flow is adjusted so that there is a zero flow through the second path. A thermistor bridge network is employed to detect the rate of zero flow through the second path. However, sensitive bead thermistors which are usually employed in such apparatus can be damaged if there is excessive current flow therethrough. This can occur when the flow meter is located in air above the water level. In addition, the sensitivity of the thermistor bridge depends on the voltage applied across the bridge, with the limiting factor for this voltage being the temperature rise of the individual thermistors. The applied voltage must be sufficiently low to prevent an excessive temperature rise when the thermistors are located in air. Heretofore, some sensitivity has been sacrificed in order to protect the thermistors.

In accordance with the present invention, an improved flow meter is provided which utilizes thermistors in a bridge network. A water sensing element is associated with the flow meter to control the application of voltage to the thermistors. When the flow meter is positioned in air, the applied voltage is removed. When the flow meter is lowered into water, a circuit is actuated to connect the voltage source to the bridge network. The flow meter of this invention also incorporates a bridge balancing device which can be actuated when the flow meter is positioned in a remote location where flow is to be measured.

Accordingly, it is an object of this invention to provide improved apparatus for measuring flows of liquids. Another object is to provide a flow meter which is adapted for use in remote locations and which can be calibrated while being positioned in such a location. A further object is to provide apparatus for increasing the sensitivity of flow meters which employ thermistors. Other objects, advantages and features of the invention should become apparent from the following detailed description, taken in conjunction with the accompanying drawing in which.

Figure 1:
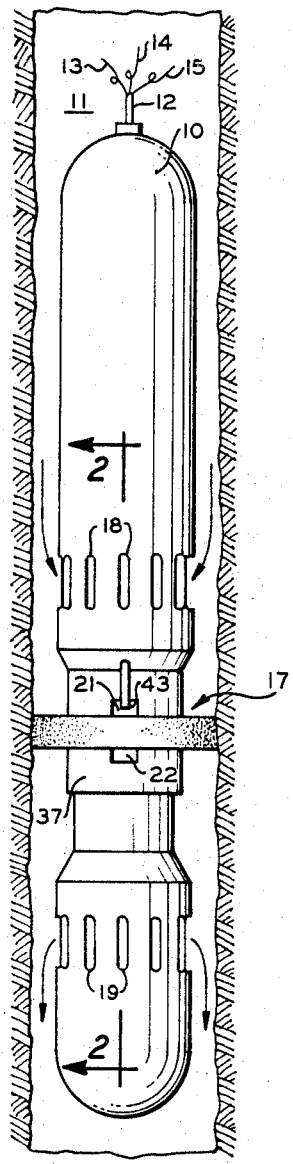
FIGURE 1 illustrates an embodiment of the flow measuring apparatus of this invention positioned within a borehole.

Referring now to the drawing in detail and to FIGURE 1 in particular, there is shown a flow measuring assembly 10 which is positioned in a borehole 11 by a cable 12. The upper end of cable 12 is connected to suitable hoisting equipment at the surface of the borehole so that assembly 10 can be lowered to measurable depths. Cable 12 contains three electrical conductors 13, 14 and 15 which connect the electrical components contained within assembly 10 to indicating and control equipment at the surface. A flexible packing device 17 is secured to assembly 10 and extends outwardly to engage the wall of the borehole in a fluid tight fit. Assembly 10 is provided with a plurality of first inlet openings 18 above packer 17. Fluid can enter the assembly from the borehole through openings 18 and be transmitted downwardly through the assembly and out into the borehole through a plurality of openings 19 positioned below packer 17. A second flow path is provided between the regions above and below packer 17 by openings 21 and 22 which are in communication with one another inside packer 17.

Figure 2:
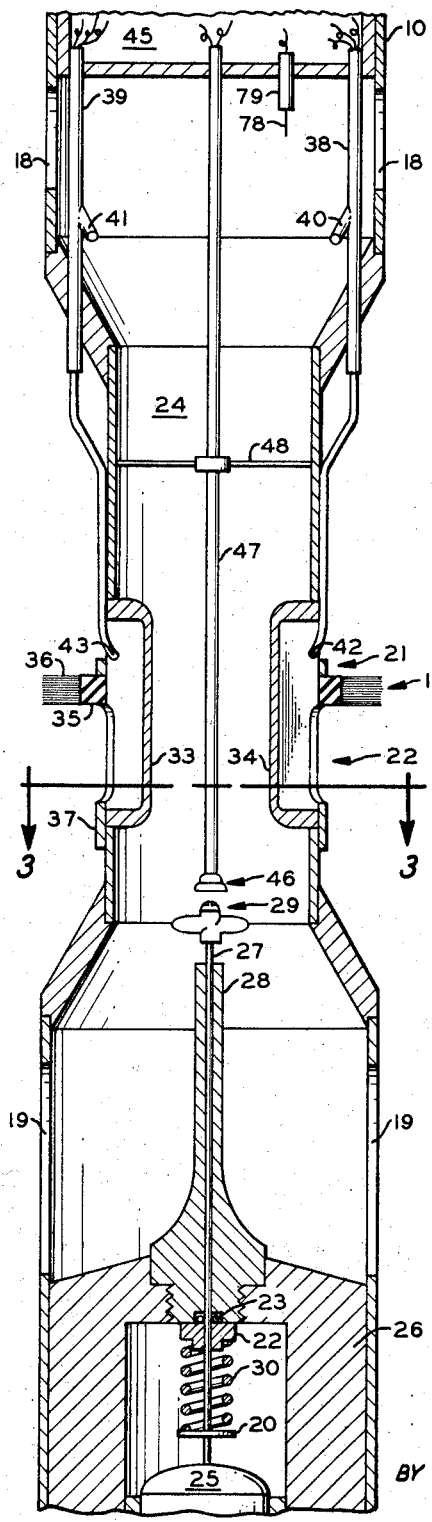
FIGURE 2 is a vertical sectional view taken along line 2—2 in FIGURE 1.
Figure 3:
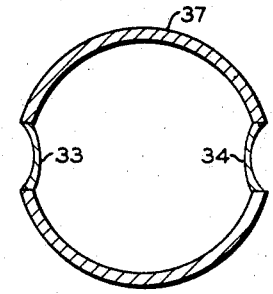
FIGURE 3 is a horizontal sectional view taken along line 3—3 in FIGURE 2.

A portion of assembly 10 is illustrated in detail in FIGURE 2. A central passage 24 communicates between inlet openings 18 and outlet openings 19. A motor 25 is secured to a housing 26 which is positioned within assembly 10 below openings 19. The drive shaft 27 of motor 25 extends upwardly through a bushing 28. A rotating collar 20 is secured to shaft 27 above motor 25. A second collar 22 is positioned about shaft 27 above collar 20 and spaced therefrom. Collar 22 is free to move longitudinally on shaft 27, but normally rotates therewith. A compression spring 30 is disposed between collars 20 and 22 to force the latter into fluid tight engagement with an O-ring seal 23 that is carried by bushing 28. An impeller 29, which is mounted on the upper end of drive shaft 27, functions to drive fluid through the first flow path 24 from openings 18 to openings 19. The second flow path between the regions above and below packer 17 is defined by a pair of concave plates 33 and 34 which are attached to the housing of assembly 10 adjacent packer 17. Packer 17, which can be in the form of an annular rubber member 35 having a plurality of bristles 36 extending therefrom, is mounted adjacent plates 33 and 34 by a support plate 37. Bristles 36 are impregnated with a heavy grease to form a fluid tight barrier.

Support rods 38 and 39 extend longitudinally through assembly 10 above packer 17. These rods position thermistors 40 and 41 adjacent inlet openings 18 and position thermistors 42 and 43 adjacent fluid opening 21. Suitable connecting leads pass through these support rods to a chamber 45 that is formed in assembly 10 above openings 18. Chamber 45 contains various electrical components of the flow meter which are described in detail hereinafter.

Figure 4:
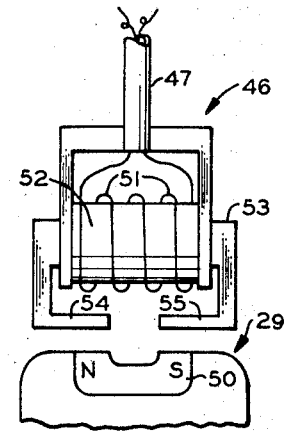
FIGURE 4 is a schematic view of impeller speed telemetering apparatus.

A telemetering assembly 46 is positioned immediately above impeller 29 by means of a rod 47 which is centrally disposed in passage 24. Rod 47 depends from chamber 45 and is secured in position by a spider 48. Telemetering assembly 46, which is illustrated schematically in FIGURE 4, is provided to measure the speed of rotation of impeller 29. A small permanent magnet 50 is mounted on the end of the impeller to rotate therewith. A coil 51 is mounted on a support 52 which is secured to the lower end of rod 47. An armature 53 extends through coil 51 and terminates in spaced pole pieces 54 and 55 which are located adjacent the poles of magnet 50. Rotation of magnet 50 thus induces a voltage across the end terminals of coil 51, the frequency of which is proportional to the speed of rotation of magnet 50.

Figure 5:
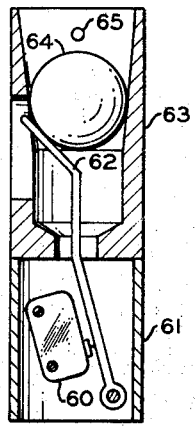
FIGURE 5 illustrates a gravity switch employed with the flow meter of FIGURE 1.

A gravity actuated control switch of the type illustrated in FIGURE 5 is secured to assembly 10, preferably inside chamber 45 of FIGURE 2. As illustrated in FIGURE 5, a switch 60 is mounted within a casing 61. A resilient arm 62 is attached at one end to casing 61, and extends therefrom into a second casing 63 where it is engaged by a ball 64. Ball 64 is retained within casing 63 by arm 62 and a retaining pin 65. When assembly 10 is in a vertical position, ball 64 presses against arm 62 and forces the latter into engagement with switch 60. When assembly 10 is placed in a horizontal position, ball 64 rolls away from the position illustrated in FIGURE 5 so that the normal resilience of arm 62 results in arm 62 being moved to a position out of engagement with switch 60.

Figure 6:
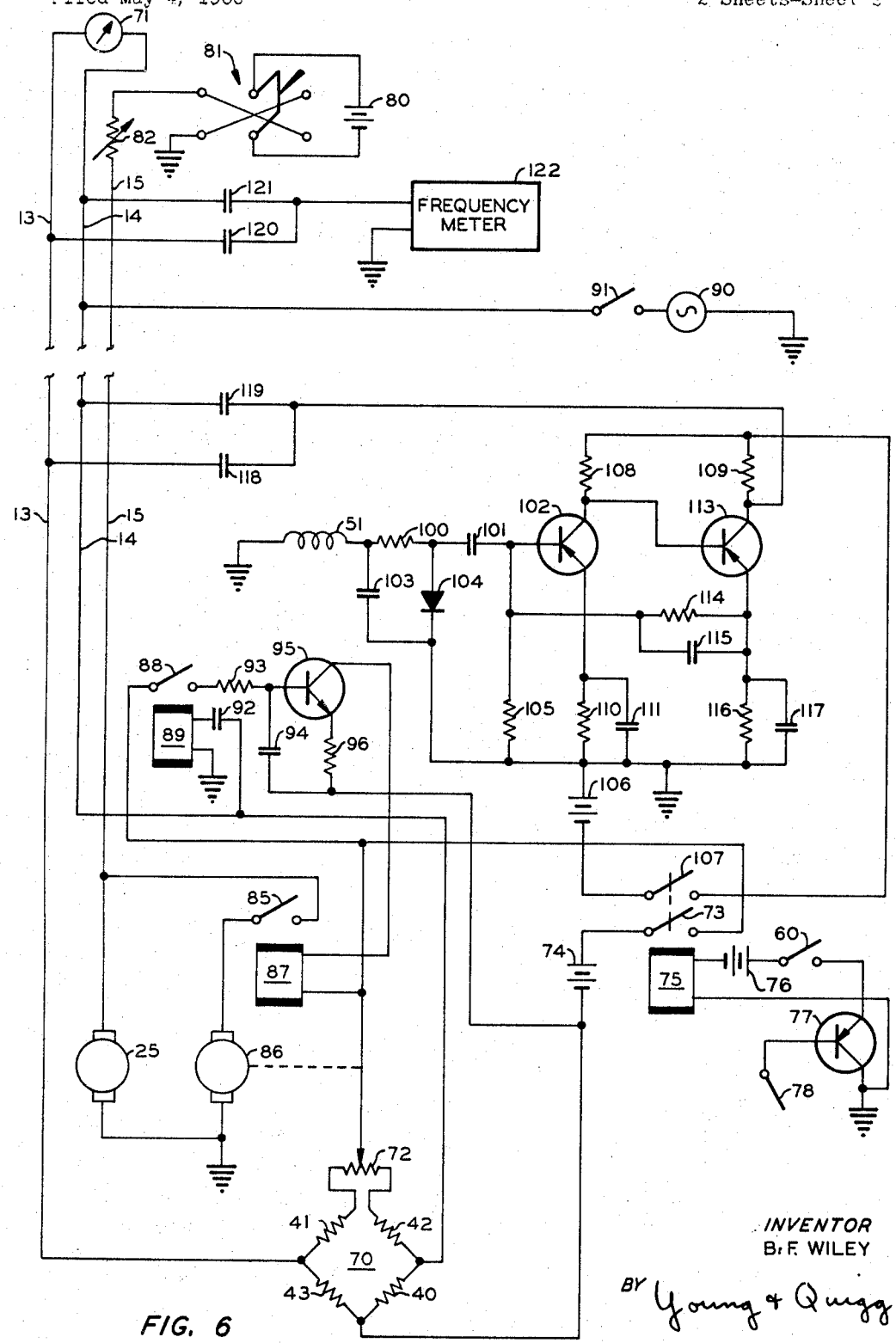
FIGURE 6 is a schematic circuit drawing of the electrical components of the flow meter.

The electrical circuit elements associated with the flow meter of this invention are illustrated schematically in FIGURE 6. Thermistors 40, 41, 42 and 43 are connected in the respective arms of a bridge circuit 70. Elements 40 and 41 are connected in opposite arms of the circuit, as are elements 42 and 43. The output signal from circuit 70 thus provides a measurement which is representative of temperature difference between thermistor pairs 41 and 40 and 42 and 43. The junction of the bridge circuit between thermistors 41 and 43 is connected to the surface by conductor 13. The junction between thermistors 40 and 42 is connected to the surface by conductor 14. A galvanometer 71 is connected between these conductors at the surface. A potentiometer 72 is connected between thermistors 41 and 42. The contactor of potentiometer 72 is connected through a switch 73 to the first terminal of a voltage source 74. The second terminal of voltage source 74 is connected to the junction between thermistors 40 and 43. Closure of switch 73 by a relay coil 75 being energized thus energizes bridge circuit 70.

Relay coil 75 is energized by a voltage source 76, one terminal of which is connected directly to one terminal of coil 75. The second terminal of voltage source 76 is connected through gravity switch 60 to the emitter of a transistor 77. The second terminal of relay coil 75 and the collector of transistor 77 are connected to ground. The base of transistor 77 is connected to an electrode 78 which is positioned within assembly 10 adjacent opening 18, as illustrated in FIGURE 2. Electrode 78 is mounted in this position by means of a rod 79. As long as gravity switch 60 remains open, relay coil 75 remains deenergized so that no voltage is applied to the bridge network. In addition, transistor 77 does not permit conduction from voltage source 76 to relay coil 75 unless electrode 78 is connected to ground. As long as the flow meter is positioned in air, there is no electrical path between electrode 78 and the grounded housing of the assembly. However, as soon as the flow meter is lowered into water, conduction takes place from electrode 78 to the housing to establish a ground connection between the collector and base of transistor 77. This energizes relay 75 to close switch 73 and apply voltage to bridge circuit 70, assuming that gravity switch 60 is closed.

Motor 25 is energized from a current source 80 which is positioned at the surface. Current source 80 is connected through a reversing switch 81, conductor 15, the latter extending to motor 25. The speed of rotation of motor 25 can be varied by adjustment of a variable resistor 82 which is connected in conductor 15.

A second motor 86 is connected to conductor 15 through a switch 85. The drive shaft of motor 86 is connected to the contactor of potentiometer 72 so as to permit adjustment of the balance point of bridge 70. Switch 81 permits the direction of motor 86 to be reversed as may be required to balance the bridge. Motor 86 is energized only when switch 85 is closed. This occurs when current is supplied to a relay coil 87. Relay coil 87 is controlled by a switch 88 which is actuated by a relay coil 89. An alternating current source 90 is connected between the upper end of conductor 14 and ground when a switch 91 is closed. A capacitor 92 is connected between the lower end of conductor 14 and the first terminal of relay coil 89, the second terminal of relay coil 89 being grounded. Closure of switch 91 thus applies alternating current through capacitor 92 to relay coil 89. This relay coil is of the type which is energized only when alternating current of the frequency of source 90 is applied. Switch 88 connects one terminal of voltage source 74 to the first terminal of a resistor 93. The second terminal of resistor 93 is connected to the first terminal of a capacitor 94 and to the base of a transistor 95. The second terminal of capacitor 94 is connected to voltage source 74. The emitter of transistor 95 is connected through a resistor 96 to voltage source 74. The collector of transistor 95 is connected through a relay coil 87 and switch 73 to the second terminal of voltage source 74. Thus, motor 86 is energized when switch 91 is closed, assuming that switch 73 is also closed.

As previously mentioned, the voltage induced across coil 51 by rotation of magnet 50 provides a signal which is representative of the speed of rotation of the impeller. The first terminal of coil 51 is connected to ground. The second terminal of this coil is connected through a resistor 100 and a capacitor 101 to the base of a transistor 102. The junction between elements 51 and 100 is connected to ground by a capacitor 103, and a rectifier 104 is connected between the junction between elements 100 and 101 and ground. A resistor 105 is connected between the base of transistor 102 and ground. The positive terminal of a voltage source 106 is connected to ground. The negative terminal of this voltage source is connected through a switch 107 to the first terminal of resistors 108 and 109. Switch 107 is closed when relay coil 75 is energized so as to apply voltage source 106 to the circuit associated with coil 51.

The emitter of transistor 102 is connected to ground through a resistor 110 and a capacitor 111 which are connected in parallel. The collector of transistor 102 is connected to the base of a transistor 113. The base of transistor 102 is connected to the emitter of transistor 113 by a resistor 114 and a capacitor 115 which are connected in parallel. The second terminals of resistors 108 and 109 are connected to the collectors of transistors 102 and 113, respectively. The emitter of transistor 113 is connected to ground by a resistor 116 and a capacitor 117 which are connected in parallel. The collector of transistor 113 is connected by capacitors 118 and 119 to conductors 13 and 14, respectively. The surface ends of conductors 13 and 14 are connected by respective capacitors 120 and 121 to the first input terminal of a frequency meter 122, the second input terminal of which is connected to ground.

The voltage induced across coil 51 is thus amplified by the two stage amplifier formed by transistors 102 and 113. The output signal from the amplifier is transmitted over conductors 13 and 14 to the surface where it is applied to frequency meter 122. The measured frequency of the amplified signal thus provides an indication of the speed of rotation of impeller 29. A suitable circuit for use as frequency meter 122 is described in U.S. Patent 2,822,688.

In operating the flow measuring apparatus, bridge circuit 70 is balanced initially after the flow meter has been lowered into the well and is submerged. This is accomplished by closing switch 91 to energize relay coils 89 and 87. Reversing switch 81 is closed, for a sufficient period of time, and in the required direction, to bring the bridge into a balanced condition, as indicated by a null reading on galvanometer 71. During the bridge balance process, motor 25 operated at moderate speed to cause circulating flow through passages 24 and through openings 21 to 22. This cools all thermistors to a temperature level near fluid temperature. Later when flow measurement is made and flow through openings 21 to 22 is nulled, maximum temperature difference between pairs of thermistors is obtained. When the apparatus is being employed to measure the rate at which water is injected into the well, water is pumped into the well from the surface. The flow downwardly through base packer 17 can follow one of two paths: from openings 18 through passage 24 to openings 19, or from openings 21 to openings 22. Impeller 29 is rotated by motor 25 at a speed such that water is pumped through passage 24 at a rate sufficient to eliminate flow from openings 21 to openings 22. The increased flow created by impeller 29 effectively eliminates the pressure differential across packer 17. Thus, there is no tendency for fluid to leak past packer 17, and the total flow is through passage 24.

The condition of null flow between openings 21 and 22 is determined by bridge circuit 70. The bridge is unbalanced a maximum amount when the total flow is past elements 40 and 41. This results from the cooling effect of the flowing fluid on elements 40 and 41. This unbalance is observed by the deflection of galvanometer 71. The speed of motor 25 is adjusted by variable resistor 82 to obtain this condition. The speed of rotation of motor 26 is measured by the frequency of the alternating signal induced across coil 51. This speed is a measure of the rate of liquid flow through the well. Of course, the flow meter must be calibrated initially under known flow conditions.

As previously mentioned, an important feature of this invention resides in the use of electrode 78 which is positioned in the flow path through opening 18. Voltage source 74 is removed from the bridge network until electrode 78 is submerged. This prevents excess current flow through the thermistors of the bridge in the absence of cooling liquid surrounding the thermistors. It should be noted that electrode 78 is positioned above all of the thermistors to assure that the four thermistors are submerged before the voltage source is applied. Gravity switch 60 provides an additional safety factor which prevents the assembly from being energized after the flow meter has been removed from the well and positioned on its side.

While the invention has been described in conjunction with a presently preferred embodiment, it should be evident that it is not limited thereto.

What is claimed is:

1. In a flow measuring device comprising an elongated housing adapted to be lowered into a well, a packer secured to said housing and extending outwardly therefrom to engage the wall of the well, first conduit means carried by said housing to define a first flow path between regions of the well on opposite sides of said packer, second conduit means carried by said housing to define a second flow path between regions of the well on opposite sides of said packer, an impeller positioned in said first flow path, means to rotate said impeller at variable speeds to direct fluid through said first flow path, means to measure the speed of rotation of said impeller, a first thermistor positioned in said first flow path, a second thermistor positioned in said second flow path, a voltage source, circuit means to connect said voltage source to said thermistors so as to provide a signal representative of the difference in flows through said first and second paths; the improvement which comprises a switch formed by two spaced electrodes positioned so that a conductive path is established therebetween by the liquid being measured when said housing is lowered into conductive liquid in the well, and means connecting said switch in said circuit means so that said voltage source is disconnected from said thermistors in the absence of a conductive path being established between said electrodes.

2. The flow measuring device of claim 1, further comprising a gravity switch connected to said housing so as to be open when said housing is positioned in a horizontal direction, and means connecting said gravity switch in said circuit means so that said voltage source is disconnected from said thermistors when said gravity switch is open.

References Cited

UNITED STATES PATENTS

| 1,822,203 | 9/1931 | Collins | 73—152 X |
| 2,822,688 | 2/1958 | Wiley | 73—155 |
| 3,038,076 | 6/1962 | Scherbatskoy | 200—152 X |
| 3,075,383 | 1/1963 | Favill et al. | 73—231 |
| 3,304,766 | 2/1967 | Hubby | 73—204 X |

RICHARD C. QUEISSER, *Primary Examiner.*

JERRY W. MYRACLE, *Assistant Examiner.*